United States Patent Office 2,866,797
Patented Dec. 30, 1958

2,866,797

IMPROVED PROCESS OF ISOLATING STEROLS

Charles Manly Berry, Minneapolis, Robert W. H. Chang, St. Paul, Ned M. Le Bard, Minneapolis, and Sidney E. Miller, St. Paul, Minn., assignors to General Mills, Inc., a corporation of Delaware No Drawing. Application November 1, 1954
Serial No. 466,212

4 Claims. (Cl. 260—397.25)

The present invention relates to an improved method of crystallizing sterols from mixtures of unsaponifiables and is particularly directed to the crystallization of sterols from unsaponifiables obtained from vegetable oils, tall oils, sugar cane oil and the like.

Water immiscible solvents in general and hydrocarbons and halogenated hydrocarbons in particular are solvents for unsaponifiables and sterols. It is difficult, however, to separate the sterols from such solvents by concentrating the solutions and crystallizing the sterols directly from them. For this reason it has been customary to remove the halogenated hydrocarbon or the hydrocarbon solvent and to redissolve the sterols in such solvents as acetone, ethanol, isopropanol and the like and to crystallize them from these solvents. This has involved the use of an additional solvent system besides the solvent used for extraction and also involves additional processing.

In the co-pending application of Berry and Miller, Serial No. 284,822, filed April 28, 1952, now Patent No. 2,729,656, issued January 3, 1956, there is described a procedure for crystallizing sterols directly from ethylene dichloride extracts which involves the addition of a small percentage of water to a concentrated extract in ethylene dichloride. Under the conditions described the sterols are precipitated by cooling and can be removed by filtering or centrifuging. While this procedure does lead to a substantially complete precipitation of the sterol component, it has been found that the sterols tend to precipitate in a somewhat gelatinous condition, particularly if the solutions are cooled rapidly. The resulting mixture of sterols and solvent is difficult to separate by filtration or centrifugation methods. Moreover, in some instances the ethylene dichloride extract may contain traces of soaps and these may precipitate along with the sterols. Soaps have a tendency to be gummy in the presence of the chlorinated hydrocarbon and, therefore, make filtration difficult by plugging up filter cloths or filters.

It has now been discovered that the above-mentioned difficulties can be overcome by the addition of a small amount of a water miscible solvent in combination with water to the solution of unsaponifiables and sterols in the halogenated hydrocarbon or hydrocarbon solvent. The addition of the water miscible solvent appears to affect the crystal structure of the sterols and results in a number of advantages.

(1) The cooling of the resulting solution leads to a dispersion of fine crystals and is less gel-like than solutions in which water alone has been added. This permits the use of more concentrated solutions and consequently higher recovery of sterols.

(2) The less gel-like mixture is more fluid and consequently can be cooled more rapidly because of its better heat exchange properties.

(3) The mixtures can be filtered more rapidly and the resulting sterol cakes can be washed more easily and filtered substantially free of residual solvent. This consequently leads to drier and more pure final product.

It is, therefore, an object of the present invention to provide a novel process of crystallizing sterols from extracts in hydrocarbon or halogenated hydrocarbon solvents which involves the addition of water and a water miscible organic solvent.

The invention is applicable to sterols in general but commercially the sterols are partly derived principally from vegetable sources. In these vegetable sources the sterols are frequently associated with the fat component and are separated therefrom by first saponifying the fat component and then extracting an aqueous solution of the resultant soaps with an immiscible organic solvent. The extracts thus obtained are then worked up for the recovery of the sterols. It is this type of extract which is the starting material for the present invention. It will be apparent, however, that the invention is applicable to any solution of a sterol in a hydrocarbon solvent or a halogenated hydrocarbon solvent. The particular origin of the sterol or the preceding processing does not affect the present invention.

The extract containing the esterols is usually concentrated to a point short of that in which crystallization would occur at the temperature involved in the concentrating operation and is then mixed with water and a water miscible organic solvent. Particularly desirable for this purpose are the lower aliphatic alcohols such as methanol and ethanol and the lower aliphatic ketones such as acetone. The water is employed in a ratio of 0.2 to 2.0% based on the weight of the solution and the water miscible organic solvent in the ratio of 2.0 to 5.0% based on the weight of the solution. The water and the water miscible solvent are preferably added as a mixed solution but may be added separately. The water and the water miscible solvent are thoroughly mixed with the extract and then the extract is allowed to cool to precipitate the sterols. The sterols may then be removed by decanting, by filtering or by centrifugal separation.

The following examples will illustrate the invention.

EXAMPLE 1

120 g. of soybean unsaponifiables which had been prepared by extracting a saponified distillation residue of soybean oil acids, with ethylene dichloride, was dissolved in 1880 g. of anhydrous ethylene dichloride to yield a solution containing 6% solids. The unsaponifiable material contained 52% sterols and, therefore, the above solution contained 3.12% sterols.

100 g. portions of the above solution were treated with varying amounts of water, water plus methanol, or methanol alone as indicated in Table I. These solutions were then cooled to 40° F. overnight to precipitate the sterols. These solutions were then filtered as dry as possible on a Buchner funnel and then dried in a steam oven to remove the residual solvents. The yields and general properties of the resultant products are shown in Table I. Unsaponifiable and soap impurities in the products were indicated by the somewhat gummy and sticky nature of the products.

Table I

| Expl. No. | Amount H₂O Added, Percent | Amount Methanol Added, Percent | Percent Yield of Sterols | Observed Properties |
|---|---|---|---|---|
| 1 | 0.5 | None | 80.1 | In all the solutions in which water alone was added, on cooling the solution set to a semi-solid mass which was difficult to pour and filtered slowly. The final sterol products were sticky and impure. |
| 2 | 1.0 | None | 80.1 | |
| 3 | 1.5 | None | 78.6 | |
| 4 | 2.0 | None | 76.9 | |
| 5 | 3.0 | None | 73.7 | |
| 6 | 0.5 | 2.4 | 78.6 | Products from 6 through 9 were crystalline, changing from platelets to reedles with increasing methanol. Easily filtered, fluid solutions which gave clean non-sticky final products. |
| 7 | 1.0 | 3.2 | 73.7 | |
| 8 | 1.0 | 4.8 | 70.5 | |
| 9 | 1.0 | 6.4 | 68.9 | |
| 10 | 2.0 | 3.2 | 75.3 | |
| 11 | 2.0 | 4.8 | 75.3 | Products 11-13 were needle-like, easily filtered, and final products similar to 6-9. |
| 12 | 2.0 | 6.4 | 72.1 | |
| 13 | 2.0 | 8.0 | 70.5 | |
| 14 | None | 6.4 | 51.3 | Products 14-17 were crystalline, needle-like, easily filtered but yields were low and final sterol products were sticky and impure. |
| 15 | None | 12.8 | 28.8 | |
| 16 | None | 16.0 | 28.8 | |
| 17 | None | 19.2 | 27.2 | |

The above table shows that when water alone is used, the sterols precipitated in a semi-solid somewhat gel-like mass which was difficult to pour and filter. When methanol alone was used the sterols precipitated in a crystalline form to yield a fluid mixture which could be easily poured and rapidly filtered. However, when methanol alone was used the yields were materially reduced and the final products were somewhat discolored crystals containing impurities probably due from the precipitation of nonsterolic unsaponifiables.

When water and methanol were used yields were high, the sterols precipitated in a crystalline form which permitted easy filtration and the sterols were of high purity. A range of 2-5% methanol appeared to be the best operating range when the water content was in the range of 0.5 to 2.0%.

EXAMPLE 2

A 6% solution of soybean oil unsaponifiables was prepared in dry ethylene dichloride. This solution was divided into two portions of 50 lbs. each. Both batches were warmed and to one (A) 0.5% (0.25 lb.) of water was added, while to the other (B) 0.3% water (0.15 lb.) and 3.5% methanol (1.55 lbs.) was added.

Both of the above solutions were placed in a cold room at 40° F. and the rate of cooling noted. After 5 hours stirring, batch A had cooled to 55° F. while B had cooled to 45° F.

At this stage batch (B) was quite fluid and easily stirred whereas (A) was somewhat thick and gelatinous. In the case of (A) the gel-like solid tended to accumulate on the sides of the container thus preventing good heat transfer and causing slower cooling.

The two batches were then transferred to a —20° F. cold room and stirring continued. After 2.5 hours, batch (A) containing added water alone was a very heavy, pasty mass and the temperature had dropped only to 45° F. whereas batch (B), to which a mixture of water and methanol had been added, was still fluid and had cooled to 30° F. Further cooling of this mixture to 10° F. still gave a fluid mixture.

The sterols were separated from the above mixtures by centrifugation on a basket type centrifuge and the sterol products were washed with 15 lbs. of ethylene dichloride. The following differences were observed between the products in this operation.

(1) The product from B centrifuged more rapidly requiring 3 minutes for centrifugation and 1 minute for spinning dry, while A required 4 minutes for centrifguation and 2 minutes for spinning dry.

(2) Only 1.5 minutes were required for centrfuging the wash ethylene dichloride through the product obtained from B and an additional 1 minute for spinning the cake dry while 3 minutes, 20 seconds was required for washing the cake from A and 15 minutes for spinning the cake dry.

(3) The resulting washed cakes were found to differ in the amount of retained solvent. That from A contained 70% solvent while that from B only 50%. Since the solvent retained in both cases still contained trace amounts of non-sterolic unsaponifiables, the lesser amount associated with the sterols in batch B led to a purer final product than in A.

EXAMPLE 3

This experiment describes the effects of adding low percentages of low molecular weight ketones or alcohols plus low percentages of water in the crystallization of sterols from ethylene dichloride. The results are compared with those obtained by adding the ketones, alcohols or water alone to the solutions.

Two hundred gram portions of a 10% solution of soybean oil unsaponifiables in ethylene dichloride were treated while warm with small amounts of alcohols, ketones and water as indicated in column 1 of Table II. The solutions were then cooled to 5° C. overnight and then compared as follows:

(1) The relative fluidities and gel-like characteristic of the solutions were measured relatively by determining the viscosity of the solutions with a Brookfield viscosimeter. The results are given in column 2. They show that with no additives or with the addition of low molecular weight alcohols or ketones alone the solutions were very fluid. On the other hand, the addition of water produced a very viscous solution. Addition of combinations of ketones plus water or alcohols plus water gave viscosities of intermediate value increasing with the molecular weight of the ketone or alcohol until with butyl alcohol and water the viscosity was almost as high as that of water alone.

(2) The solutions containing water alone were compared with those in which combinations of water and a low molecular weight ketone or alcohol were used by centrifuging the sterol suspensions at 2000 R. P. M. in a 50 ml. graduated centrifuge tube and measuring the volume of the sterol cake. These results are given in column 3 of Table II. This technique gave an approximation of the tendency of the crystals to retain solvent. Thus with 0.5% of water alone the gel-like character of the precipitated sterols tended to retain considerable solvent and gave a cake volume of 35 ml. whereas the mixture containing 4% methanol plus 0.5% water gave a volume of only 11 ml.

(3) The crystalline suspensions were filtered on a Büchner funnel (3¾ inches in diameter) using a vacuum of 15 inches and the time required to remove the solvent from the solids noted.

(4) The yield of dry crystals was also determined. Highest yields were obtained with those solutions in which low amounts of water were present. Thus, the presence of water leads to higher yields of sterols but water alone tends to give suspensions which are difficult to separate either by centrifugation or filtration. This tendency is overcome by the addition of lower percentages of low molecular weight alcohols or ketones.

Table II

| Additive to Ethylene Dichloride Solution | Viscosity of Cold Soln. in cps. | Spindle No. | Volume of Sterol Cake in ml. after Centrifuging at 2,000 R. P. M. | Filtration at 15-inch vacuum | |
|---|---|---|---|---|---|
| | | | | Time, Min. | Yield Sterols, gm. |
| Extract alone | 8 | 1 | | 3 | 4.6 |
| 0.5% $H_2O$ | 2,300-2,400 | 3 | 35 | 13 | 8.5 |
| 4% Acetone | 6-7 | 1 | | 3 | 4.9 |
| 4% Acetone+0.5% $H_2O$ | 200-300 | 3 | 16 | 2 | 7.9 |
| 4% Isopropanol | 8 | 1 | | 3 | 2.4 |
| 4% Isopropanol+0.5% $H_2O$ | 1,530-1,800 | 3 | 18 | 3 | 6.3 |
| 4% Ethanol | 8-10 | 1 | | 7 | 4-6 |
| 4% Ethanol+0.5% $H_2O$ | 180-220 | 3 | 14 | 3 | 5.9 |
| 4% n Butanol | 8-12 | 1 | | 3 | 2.9 |
| 4% n Butanol+0.5% $H_2O$ | 1,850-1,920 | 3 | | 3 | 6.4 |
| 4% Methanol | 10-15 | 1 | | 13 | 5.2 |
| 4% Methanol+0.5% $H_2O$ | 50-60 | 1 | 11 | 9 | 7.0 |
| 4% Methyl Ethyl Ketone | 5 | 1 | | 3 | 4.2 |
| 4% Methyl Ethyl Ketone+0.5 $H_2O$ | 890-980 | 3 | 23 | 2 | 7.7 |

EXAMPLE 4

This experiment demonstrates the improvement in yields of sterols obtained by adding low percentages of water and low molecular weight ketones or alcohols to solutions of soybean oil unsaponifiables in Skellysolve B (a petroleum hydrocarbon).

Soybean unsaponifiables obtained by saponifying and extracting a distillation residue from acidulated soy soap stock were dissolved in Skellysolve B to yield a 10% solution. Portions of this solution were treated as indicated in Table III, column 1, and cooled to 5° C. overnight. The solutions were then filtered and the recovered sterols were dried and weighed. The percentage yields of sterols based on the unsaponifiables are given in column 2.

Table III

| Additives to Skellysolve Soln. | Yield of Sterols, percent |
|---|---|
| No additives | 9.4 |
| 0.5% water | 25.3 |
| Acetone 4%-$H_2O$ 0.5% | 36.0 |
| Methanol 4%-$H_2O$, 0.5% | 33.0 |
| Isopropanol 4%-$H_2O$, 0.5% | 25.3 |

Now, therefore, we claim:

1. Process for the recovery of sterols from a solution thereof in ethylene dichloride which comprises adding thereto from 0.2 to 2% of water and from 2 to 5% of methanol, to precipitate sterols and recovering the sterols.

2. Process of recovering sterols from a solution thereof in a water immiscible organic solvent selected from the group consisting of petroleum hydrocarbon solvents and ethylene dichloride, which comprises adding water and a water miscible solvent selected from the group consisting of methanol, ethanol, isopropanol, n-butanol, acetone, and methyl ethyl ketone to said solution to precipitate the sterols and recovering the sterols.

3. Process of recovering sterols from a solution thereof in ethylene dichloride which comprises adding water and a water miscible solvent selected from the group consisting of methanol, ethanol, isopropanol, n-butanol, acetone, and methyl ethyl ketone to said solution to precipitate the sterols and recovering the sterols.

4. Process of recovering sterols from a solution thereof in a petroleum hydrocarbon solvent which comprises adding water and a water immiscible solvent selected from the group consisting of methanol, ethanol, isopropanol, n-butanol, acetone, and methyl ethyl ketone to said solution to precipitate the sterols and recovering the sterols.

References Cited in the file of this patent

UNITED STATES PATENTS

| | | |
|---|---|---|
| 2,280,815 | Fernholz | Apr. 28, 1942 |
| 2,371,467 | Porsche | Mar. 13, 1945 |
| 2,494,726 | Sifferd | Jan. 17, 1950 |
| 2,679,503 | Christensen | May 25, 1954 |